(12) United States Patent
Barton et al.

(10) Patent No.: US 7,482,708 B1
(45) Date of Patent: Jan. 27, 2009

(54) APPARATUS FOR CONTROLLING POWER DISTRIBUTION TWO SUBSYSTEMS

(75) Inventors: Bruce Barton, Huntington, NY (US); Russell Barton, Northport, NY (US)

(73) Assignee: Bits Limited, Northport, NY (US)

( * ) Notice: Subject to any disclaimer, the term of this patent is extended or adjusted under 35 U.S.C. 154(b) by 0 days.

(21) Appl. No.: 10/502,507

(22) PCT Filed: Mar. 7, 2004

(86) PCT No.: PCT/US2004/023879

§ 371 (c)(1),
(2), (4) Date: Jul. 21, 2004

(87) PCT Pub. No.: WO2006/022632

PCT Pub. Date: Mar. 2, 2006

(51) Int. Cl.
H02J 1/00 (2006.01)
(52) U.S. Cl. ......................................... 307/30
(58) Field of Classification Search ................... 307/30
See application file for complete search history.

(56) References Cited

U.S. PATENT DOCUMENTS 5,804,951 A 9/1998 Rivet
6,349,023 B1 2/2002 Greenberg
2003/0042796 A1 * 3/2003 Siu ............................. 307/39

* cited by examiner

Primary Examiner—Robert L. Deberadinis
(74) Attorney, Agent, or Firm—I. Zborovsky

(57) ABSTRACT

A device for controlling a power distribution to subsystems, has a power input to be connected to a power source, a primary power output to be connected to a primary device; at least one secondary power output to be connected to at least one secondary device; sensing unit for sensing when a current level falls below a threshold in response to the primary device being turned off or going into a standby mode and when the current level raises above a threshold in response to the primary device being turned on; executing unit operatively connected with the sensing unit and operative for interrupting a power supply to the at least one secondary device when the sensing unit sense the current level below the threshold and supplying power to the at least one secondary device when the sensing unit sense the current level above the threshold correspondingly and adjusting unit for adjusting the threshold depending on a current of the primary device during periods of turning off, going into standby mode, and turning on.

4 Claims, 3 Drawing Sheets

APPARATUS FOR CONTROLLING POWER DISTRIBUTION TWO SUBSYSTEMS

TECHNICAL FIELD

The present invention relates to devices for controlling a distribution of power to subsystems, for example to a main device and at least one secondary device or a plurality of secondary devices.

More particularly, the present invention relates to the above mentioned devices formed as electrical power strips and power control sensors which can be used with new devices having two modes of operation, standby or off and full on, with the use of main device or secondary devices.

BACKGROUND ART

One type of an electrical distribution device is the power strip or power control center, which generally comprises of a row of power outlets, switched or unswitched, to distribute power to a primary device and secondary device(s) from a standard outlet (e.g., wall outlet). Some power strips and control centers contain options like circuit breakers, fuses and/or surge protectors, for example.

In newer personal computers the system can turn itself off and is controlled by the operating system. During the system shutdown, there is a delay in which the operator must wait for the system to finish before turning off the secondary device (s). Depending on the operating software and programs, this can be a long time. Using this invention, the user may leave after the shutdown is started. When the system finishes and switches off or to the standby mode, the secondary device(s) will be turned off.

When used with computer devices, each device is plugged into a separate outlet with the computer plugged into the main outlet. When the computer is turned on, the current level increases to a high enough level to turn on the secondary device(s). Other constant power outlets may also be included for wake up devices, such as modems capable of bringing the system out of standby mode.

U.S. Pat. No. 4,731,549; U.S. Pat. No. 4,825,140 and U.S. Pat. No. 4,970,623 are methods for controlling secondary device(s). All require internal power supplies and many components, making them too expensive for mass production and difficult to fit in a standard power strip.

Some improved solutions are disclosed in our U.S. Pat. No. 6,501,195, U.S. Pat. No. 6,759,762 and U.S. Pat. No. 6,759,763, and application Ser. No. 09/953,743

SUMMARY OF THE INVENTION

Accordingly, it is an object of present invention to provide a device for controlling distribution of power to subsystems, which avoids the disadvantages of the prior art.

In keeping with these objects and with others which will become apparent hereinafter, one feature of present invention resides, briefly stated, in a device for controlling a power distribution to subsystems, comprising a power input to be connected to a power source, a primary power output to be connected to a primary device; at least one secondary power output to be connected to at least one secondary device; sensing means for sensing when a current level falls below a threshold in response to the primary device being turned off or going into a standby mode and when the current level raises above a threshold in response to the primary device being turned on; executing means operatively connected with said sensing means and operative for interrupting a power supply to said at least one secondary device when the sensing means sense the current level below the threshold and supplying power to said at least one secondary device when said sensing means sense the current level above the threshold correspondingly and adjusting means for adjusting the threshold depending on a current of the primary device during periods of turning off, going into standby mode, and turning on.

In accordance with one embodiment of the invention, the adjusting means include means for adjusting a biasing voltage to said executing means.

In accordance with another embodiment of the invention, the adjusting means include means for adjusting an increase of the output voltage of said current sensing means by said increasing means.

In accordance with further embodiment of the invention, the adjusting means include means for adjusting an output voltage of said current sensing means.

The new features of the invention are set forth in the appended claims. The invention itself however will be best understood from the following description of the embodiments, which is accompanied by the following drawings.

BEST MODE OF CARRYING OUT OF THE INVENTION

Figure 1:
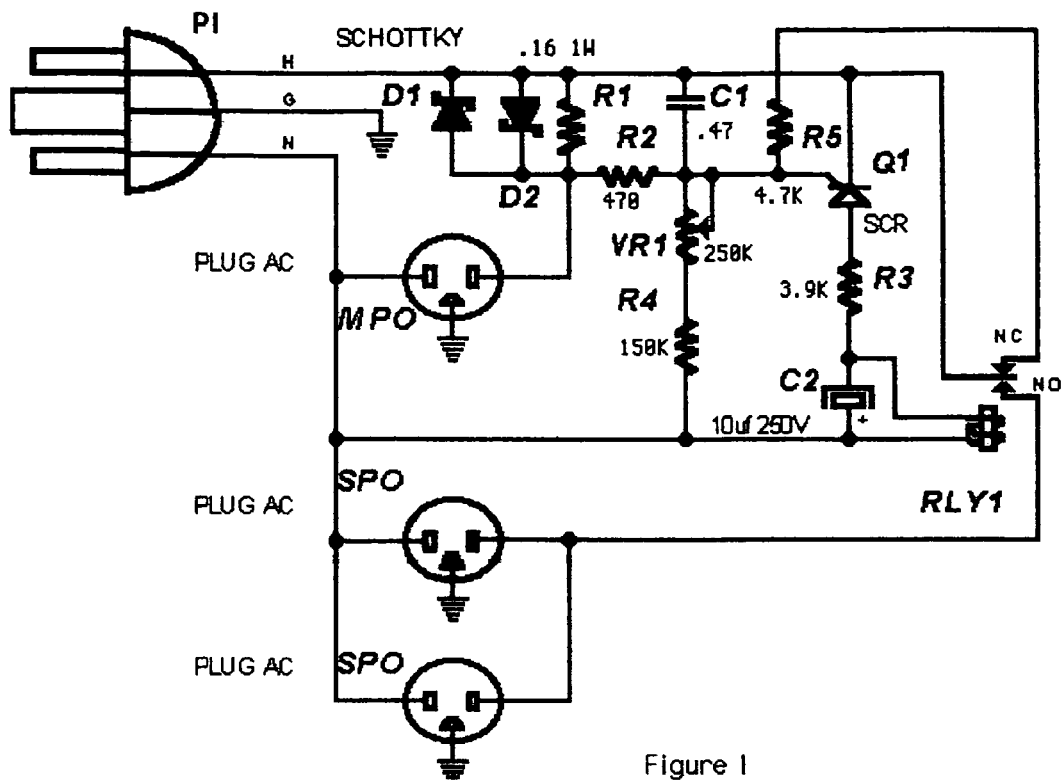
FIG. 1 is a view showing a device for controlling a power distribution to subsystems in accordance with one embodiment of the present invention.

A device for distributing power to subsystems in accordance with one embodiment of the present invention as shown in FIG. 1 has a power input (PI) which is connectable to an AC power source. A current sensing resistor (R1) is arranged in series with the power input (PI). It converts the current drawn by a main system or device connected to a main power output (MPO), into a voltage. Diodes (D1 and D2) are placed in parallel with the resistor (R1) to limit the power to the resistor, by limiting the voltage on the resistor to a schottky diode drop or about 0.35 volts. By using diodes with a low voltage drop, the heat produced at high current draws though the main power output (MPO) will be small, allowing the device to be placed in smaller housing. The diodes (D1 and D2) are placed in both directions because the current through the resistor (R1) may be alternating.

A voltage divider is formed by three resistors (R2, R4, and VR1) so that a small voltage, adjustable from about 0.2 volts to 0.5 volts peak, is formed across the gate bias resistor (R2). This voltage is small enough as not to trigger the gate of the SCR (Q1). The resistors (R2, R4, and VR1) form a means for increasing the voltage to provide triggering of the executing means despite the limiting of the voltage by the diodes (D1 and D2).

In this embodiment VR1 forms means for adjusting the bias voltage across the bias resistor (R2) to the gate of the SCR (Q1) of the executing means and thereby for adjusting the threshold, which will be explained in detail herein below.

The gate bias resistor (R2) and the capacitor (C1) form a time constant to filter out line noise and prevent false triggering of the SCR (Q1).

When the voltage across the current sensing resistor, created by the main device power level, plus the voltage across the bias resistor (R2), exceeds the gate trigger voltage of the SCR (Q1), the SCR (Q1) will switch on. Current now flows through the SCR (Q1), current limiting resistor (R3) to charge the capacitor (C2). The current limiting resistor (R3) limits the current to the SCR (Q1) as well as forming a resistive capacitive time constant to slow down the charging the capacitor (C2). This helps prevent false triggers as well as creating a turn on time delay for secondary systems system (s), if wanted.

The energy now stored in capacitor (C1) turns on a relay (RLY1) to control power supply to secondary power outputs (SPO), to which the secondary system (device) or secondary systems (devices) are connected.

A hysteresis resistor (R5) is used to lower the voltage across the gate bias resistor (R2) when the relay (RLY1) is off. When the relay is on, one side of the hysteresis resistor (R5) is disconnected, increasing the voltage across the gate bias resistor. This prevents oscillation of the relay (RLY1) if the main device power level is close to the threshold of the sensing means.

In the above described embodiment the current sensing resistor (R1) together with the gate bias resistor (R2) and the SCR (Q1) constitute sensing means which sense a current level below or above a predetermined threshold, while the relay constitutes executing means which, in response to the sensing of the current level by the sensing means interrupts the current supply to the secondary device(s) when the sensed level is below the threshold as a result of turning off or going into standby mode of the primary device or supplies the current to the secondary device(s) when the current level sensed by the sensing means is above the threshold as a result of turning on of the primary device.

Figure 2:
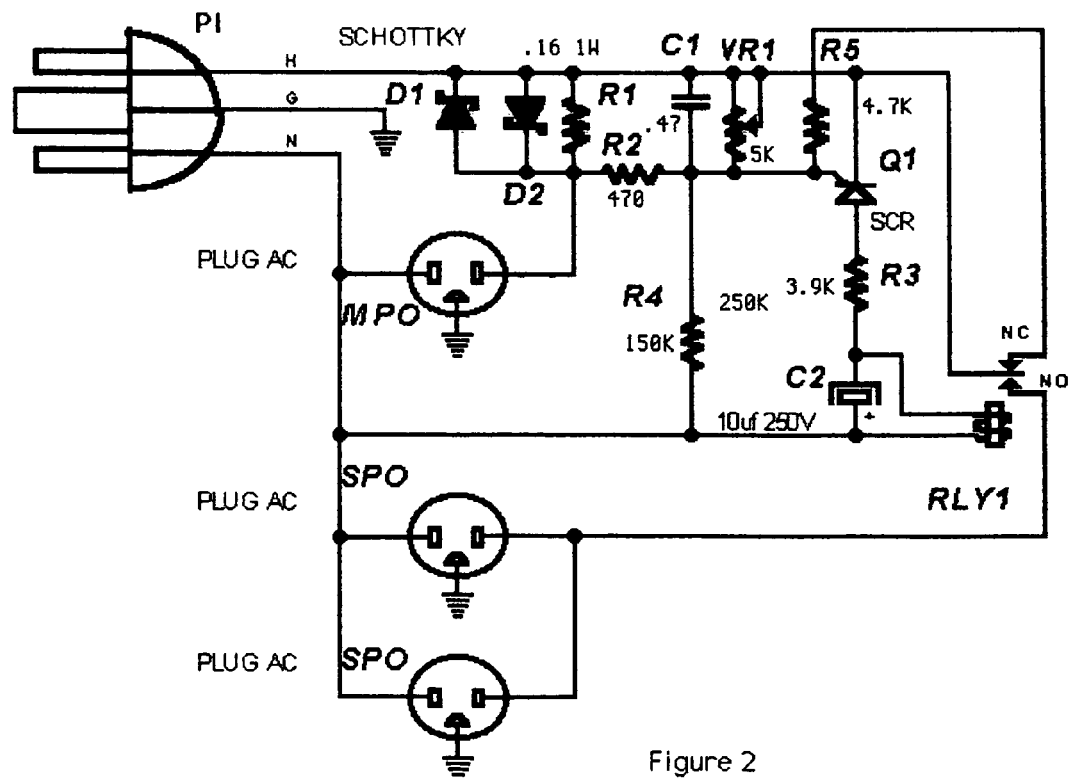
FIG. 2 is a view showing the inventive device in accordance with another embodiment of the present invention.

FIG. 2 shows another embodiment of the inventive device. It substantially corresponds to the embodiment of FIG. 1. However, in the device in accordance with the embodiment of FIG. 2, the adjustment device VR1 has been moved to be across the gate off the SCR (Q1) to form a voltage divider with both the bias resistor (R2) and the voltage divider resistor (R4). This allows the triggering voltage to the gate of the SCR (Q1) of the executing means to be set.

In this embodiment VR1 forms means for adjusting the level of increased voltage form the bias resistor (R2) to the SCR (Q1) of the executing means and thereby for adjusting the threshold, which will be explained in detail herein below.

If Q1 can be replaced with another type triggered device such as a triac. If a triac is used with a dc relay, a rectifier must be used.

Figure 3:
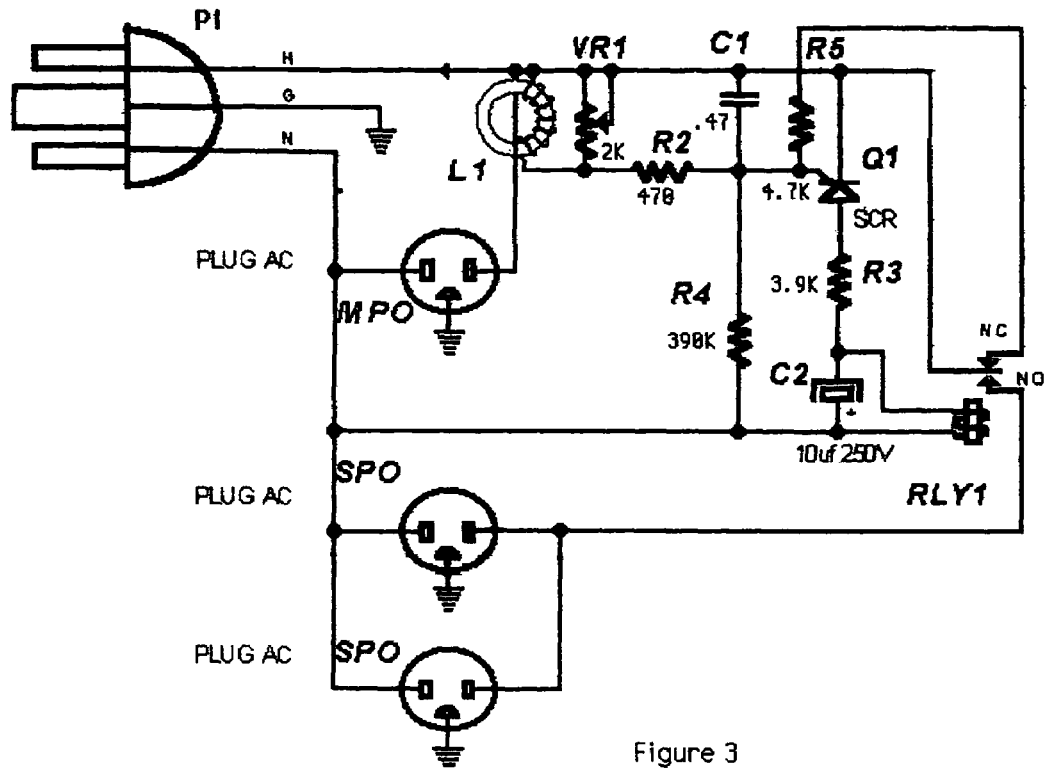
FIG. 3 is a view showing the inventive device in accordance with still a further embodiment of the present invention.

FIG. 3 shows another embodiment of the device in accordance with the present invention. In this embodiment the current sensing resistor and limiting diodes are replaced by a current sensing coil (L1). The saturating core of the coil (L1) allows the coil's output to be adjusted by a variable load resistor (VR1) across the coil.

Many new computers and other electronic devices use high efficiency power supplies, these devices draw current with a high frequency component. Because of this, the coil (L1) can be a high frequency current sense coil and sense that component of the current.

Figure 4:
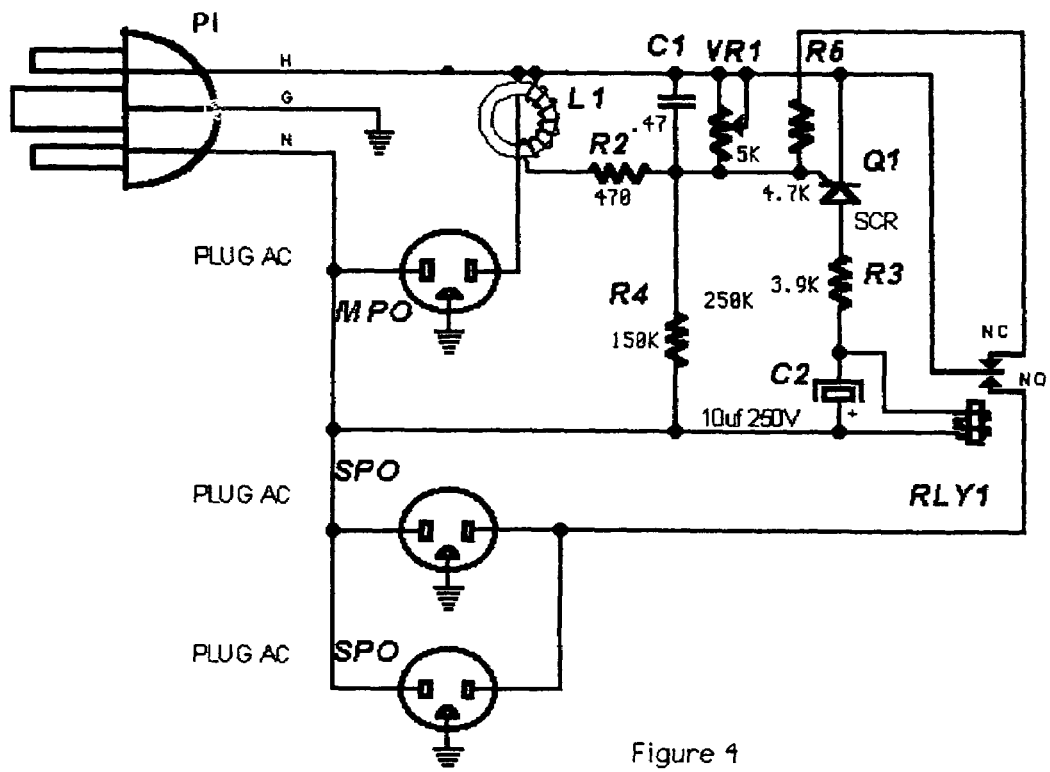
FIG. 4 is a view showing the inventive device in accordance with still a further embodiment of the present invention.

FIG. 4 shows another embodiment of the device in accordance with the present invention. In this embodiment VR1 has been moved to the gate of the SCR (Q1) to form a voltage divider instead of a variable load similar to FIG. 2.

The voltage divider resistor (R4) in FIGS. 3 and 4 will vary its value depending on the impedance of the sensing coil (L1).

Figure 5:
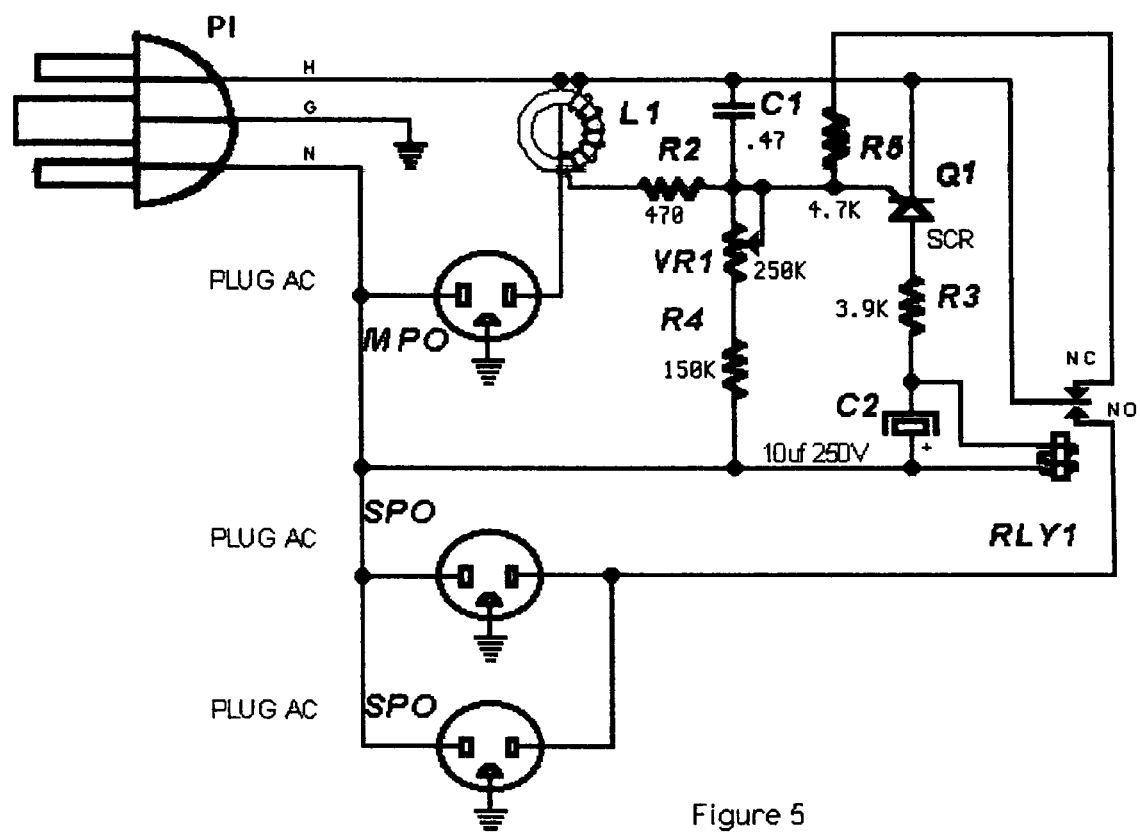
FIG. 5 is a view showing the inventive device in accordance with still a further embodiment of the present invention.

FIG. 5 shows another embodiment of the device in accordance with the present invention. In this embodiment VR1 has been moved to the voltage divider to vary the voltage across bias resistor (R2) similar to FIG. 1. In this figure the value of voltage divider resistor (R4) and the adjustment resistor (VR1) will vary their values depending on the impedance of the sensing coil (L1).

FIG. 6 shows another embodiment of the device in accordance with the present invention. In this embodiment VR1 is wired as a combination of FIG. 4 and FIG. 5.

In all embodiments of the present invention, VR1 for adjusting means which by manual adjustment by an operator, adjusts the threshold, depending on the current of the primary devices during the periods of their turning off, going into standby mode, and turning on.

In particular, when in one system the primary device has a higher current during the periods of turning off, going into standby mode, and turning on, the adjusting means VR1 adjust the above-mentioned threshold to be higher. To the contrary, when in another system the primary device has a lower current (than the primary device of the first system) during the periods of turning off, going into the standby mode, and turning on, the adjusting means VR1 adjust the threshold to be lower.

It is to be understood that the device in accordance with the present invention can be used on many different voltages by changing the resistor values, including but not limited to 100, 120 and 220 Vac, for domestic and international use.

Instead of the SCR (Q1) transistors or other switching devices can be used. Also, separate diodes can be used instead of the diode bridges. The diodes (D1 and D2) also can be replaced by any voltage-limiting device.

It will be understood that each of the elements described above, or two or more together, may also find a useful application in other types of constructions differing from the types described above.

While the invention has been illustrated and described as embodied in device for controlling power distribution to subsystems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for controlling a power distribution to subsystems, comprising a power input to be connected to a power source, a primary power output to be connected to a primary device; at least one secondary power output to be connected to at least one secondary device; sensing means for sensing when a current level falls below a threshold in response to the primary device being turned off or going into a standby mode and when the current level raises above a threshold in response to the primary device being turned on; executing means operatively connected with said sensing means and operative for interrupting a power supply to said at least one secondary device when the sensing means sense the current level below the threshold and supplying power to said at least one secondary device when said sensing means sense the current level above the threshold correspondingly and adjusting means for adjusting the threshold depending on a current of the primary device during periods of turning off, going into standby mode, and turning on, wherein said adjusting means is configured as means for adjusting a biasing voltage to said executing means; and means for increasing an output voltage of said current sensing means, said adjusting means including means for adjusting an increase of the output voltage of said current sensing means by said increasing means.

2. A device as defined in claim 1, wherein said current sensing means include current sensing coil.

3. A device as defined in claim 1, wherein said current sensing means include high frequency current sensing coil.

4. In combination with an electrical power source a primary device, and at least one secondary device, a device for controlling a power distribution comprising a power input to be connected to the power source; a primary power output to be connected to the at least one secondary device; sensing means for sensing when a current level falls below a threshold in response to the primary device being turned off or going into a standby mode and when the current level raises above a threshold in response to the primary device being turned on; executing means operatively connected with said sensing means sense the current level below the threshold and supply power to said at least one secondary device when said sensing means sense the current level above the threshold correspondingly; and adjusting means for adjusting the threshold depending on a current of the primary device during periods of turning off, going into standby mode, and turning on, wherein said adjusting means is configured as means for adjusting a biasing voltage to said executing means; and means for increasing an output voltage of said current sensing means, said adjusting means including means for adjusting an increase of the output voltage of said current sensing means by said increasing means.

\* \* \* \* \*